United States Patent [19]

Proulx et al.

[11] E Patent Number: Re. 33,498

[45] Reissued Date of Patent: Dec. 18, 1990

[54] METHOD AND STRUCTURE FOR PROPERLY ALIGNING FORMS IN A PRINTER

[75] Inventors: Thomas A. Proulx, Palo Alto; Thomas H. A. LeFevre, San Jose, both of Calif.

[73] Assignee: Intuit, Palo Alto, Calif.

[21] Appl. No.: 369,391

[22] Filed: Jun. 21, 1989

Related U.S. Patent Documents

Reissue of:

[64] Patent No.: 4,725,156
Issued: Feb. 16, 1988
Appl. No.: 684,652
Filed: Dec. 21, 1984

[51] Int. Cl.[5] ..... B41J 13/26

[52] U.S. Cl. ..... 400/630; 400/582; 400/583.3; 400/706; 400/709.2

[58] Field of Search ..... 400/74, 550, 578, 579, 400/580, 581, 582, 583, 583.1, 583.2, 583.3, 597, 598, 630, 632, 632.1, 703, 706, 707.2, 707.5, 709, 709.2; 364/518, 519; 377/15, 25; 101/485, 486, DIG. 36

[56] References Cited

U.S. PATENT DOCUMENTS

| | | | |
|---|---|---|---|
| 3,576,367 | 4/1971 | Sable | 101/426 |
| 3,587,812 | 6/1971 | Budenstein | 400/616.1 |
| 3,658,163 | 4/1972 | Sniderman | 400/583.3 |
| 3,804,226 | 4/1974 | Ellis | 400/583.3 |
| 3,842,506 | 10/1974 | Pascua et al. | 400/706 |
| 3,963,110 | 6/1976 | Hyland et al. | 400/582 |
| 4,026,405 | 5/1977 | de Poncins | 400/583.3 |
| 4,066,015 | 1/1978 | Polko | 400/709.2 |
| 4,070,223 | 1/1978 | Stalzer | 400/616.1 |
| 4,251,162 | 2/1981 | Kammerer et al. | 400/632 |
| 4,266,880 | 5/1981 | Buchanan | 400/598 |
| 4,316,199 | 2/1982 | Greelig et al. | 346/160 |
| 4,403,301 | 9/1983 | Fessel | 400/279 |
| 4,428,287 | 1/1984 | Greiner | 101/350 |
| 4,508,462 | 4/1985 | Haruhara | 400/582 |
| 4,541,337 | 9/1985 | Schaul | 400/583.3 |
| 4,683,366 | 4/1987 | Posh | 400/279 |

FOREIGN PATENT DOCUMENTS

| | | | |
|---|---|---|---|
| 91293 | 6/1982 | Japan | 400/583.3 |
| 107874 | 7/1982 | Japan | 400/706 |
| 156286 | 9/1982 | Japan | 400/583 |
| 55755 | 3/1984 | Japan | 400/583.3 |

*Primary Examiner*—David A. Wiecking
*Attorney, Agent, or Firm*—Skjerven, Morrill, MacPherson, Franklin & Friel

[57] ABSTRACT

This invention achieves accurate registration of a web of forms such as preprinted checks in a printer controlled by a computer, wihtout requiring skill on the part of the operator or extra equipment for the printer. The method and apparatus of this invention uses specially marked forms in conjunction with a computer program. The computer program puts indicator information onto the marked form which has been inserted into the printer, receives input from an operator about the location of the indicator information, and moves the form in the printer to the proper location to receive printed information. The method of this invention is for the operator to insert forms into the printer, and then operate a set-up computer program. This program instructs the printer to put a mark on the form on the line to which it is currently set. The computer then instructs the operator to type into the computer the line number on which the mark was just printed. With this invention, the computer calculates the adjustment needed to properly align the form and makes the adjustment with no more assistance from the operator.

24 Claims, 5 Drawing Sheets

WAS THE UP AND DOWN
POSITIONING OK? (Y/N) : N

WITHOUT MOVING THE CHECKS, LOOK AT THE
POINTER LINE JUST PRINTED ON THE CHECK.
WHAT POSITION NUMBER DOES IT POINT TO?

(1–21) :

PRESS F10 TO CONTINUE

F1 – HELP

ESC – MAIN MENU

INTUIT
540 UNIVERSITY AVENUE
PALO ALTO CA. 94031

NON-NEGOTIABLE BANK
1 VOID STREET
INSOLVENT,ALASKA 1093 00-00/000

PAY TO THE ORDER OF _____ $ _____

_____ DOLLARS

MEMO _____

⑈001093⑈ ⑆ 123456789⑆ 12345 ⑈ 09876⑈

INTUIT
540 UNIVERSITY AVENUE
PALO ALTO CA. 94031

NON-NEGOTIABLE BANK
1 VOID STREET
INSOLVENT,ALASKA 1094 00-00/000

PAY TO THE ORDER OF _____ $ _____

_____ DOLLARS

MEMO _____

⑈001094⑈ ⑆ 123456789⑆ 12345 ⑈ 09876⑈

INTUIT
540 UNIVERSITY AVENUE
PALO ALTO CA. 94031

NON-NEGOTIABLE BANK
1 VOID STREET
INSOLVENT,ALASKA 1095 00-00/000

PAY TO THE ORDER OF _____ $ _____

_____ DOLLARS

MEMO _____

⑈001095⑈ ⑆ 123456789⑆ 12345 ⑈ 09876⑈

FIG. 5

METHOD AND STRUCTURE FOR PROPERLY ALIGNING FORMS IN A PRINTER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to properly aligning and registering forms in a printer. More particularly it provides a method and structure for use by an operator to achieve automatic alignment of forms.

2. Description of the Prior Art

There have been many methods and devices developed to improve alignment of paper and forms in printers. Apparatus and a method of properly inserting paper into a printer were described by Stalzer, U.S. Pat. No. 4,070,223 issued Jan. 24, 1978. Stalzer provides perforated strips which attach to paper or forms having tractor feed perforations and which guide the leading edge of the paper into the printer. However the strips of Stalzer do not provide for accurate vertical registration of the inserted forms with respect to the printing devices.

Kammerer et al. U.S. Pat. No. 4,251,162 issued Feb. 17, 1981 describes a form transport device for guiding the leading edges of a form or set of forms into a printer. Again, the transport device of Kammerer et al. does not provide for accurate vertical registration of the inserted form.

Greenig, U.S. Pat. No. 4,316,199, issued Feb. 16, 1982 describes apparatus which provides for putting a master form on a drum, using laser light to add graphics information to the form and computer logic to further add data, thus generating a composite picture printed with information from three sources. The invention of Greenig uses special purpose equipment not readily available to large numbers of computer printer users.

Greiner, U.S. Pat. No. 4,428,287, issued Jan. 31, 1984, describes a method appropriate for multi-color printing presses in which an optical device detects the location of registration marks on the paper to be printed, and feeds information to a computer which in turn adjusts the registration of the drums which apply color to the paper. Again, the device of Greiner is not applicable for the large variety of computer printers available today.

Budenstein et al, U.S. Pat. No. 3,587,812 issued June 28, 1971, describes apparatus for laterally registering forms in a high speed printer > having indicia along one edge of a longitudinally extending bar member . . . Guide means positioned adjacent one end of the registration apparatus cooperate with the paper feed mechanism . . . (Column 3, lines 4–10).

Budenstein et al. also state

> Additional indicia may also be provided along a second edge of the registration apparatus which corresponds to the vertical displacement of individual print characters . . . (Column 3, lines 18–20).

Thus Budenstein et al. provide apparatus for assisting the operator. Budenstein et al. do not disclose or suggest, however, a method of automatic vertical forms registration.

Fessel, U.S. Pat. No. 4,403,301 describes a method and structure for registration of forms whereby an operator begins operation by commanding the computer to move the paper into tentative position, then instructs the computer to display on a screen the information to be printed. The operator then adjusts the location of the form before printing. Fessel states > According to the basic concept of the invention, upon actuation of a character key, the carriage is moved relative to the record carrier corresponding to the setting movement associated with the particular character key actuated but without printing the character, and the characters stored in the memory are printed out only upon receipt of a separate instruction signal by reading out the character and position information in the memory and causing the carriage to repeat the stored setting movements under control of the memory. (Fessel, Column 1, line 62 to Column 2, line 4.)

The method and device of Fessel requires that the user observe the location of the print head with respect to the line on the form to be printed in order to properly locate the form in the printer. However, with printers designed so that the location of the print head is difficult to see, the method of Fessel does not easily provide for accurate vertical registration.

Forms having marks for the purpose of lining up the paper in a printer are known. For example, Polko, U.S. Pat. No. 4,066,015, issued Jan. 3, 1978 describes putting a single mark on the edge of the paper. The operator lines up this mark with a mark on the print roll of the printer. Sniderman, U.S. Pat. No. 3,658,163, issued Apr. 25, 1972 also describes > paper that has been preprinted or premarked with two vertical rows of line marks disposed along one edge thereof, each line mark representing a selectable printing line thereon. (Sniderman, abstract.)

According to Sniderman,

> scanning means associated with the line printer in cooperation with advancing preprinted line marks serves to detect the arrival of the selected printing line in printing position . . . (Sniderman, Abstract.)

Neither Polko nor Sniderman provide for accurate and automatic vertical registration without special hardware.

Various manufacturers provide forms having a top-of-form indicator mark placed on the form to be lined up with the print head by the operator. Unfortunately in many printers it is difficult to see where the print head will print or to see the top-of-form mark when the paper is in position.

Printers, computers, and software made by different companies will not necessarily designed to work together. The number of these companies is increasing. The technologies involved are continuously and rapidly changing. Any device or method for aligning forms in a printer which is not adaptable to new printers and new forms risks obsolescence.

The prior art methods of aligning forms without the use of specially adapted equipment often waste forms. If the alignment of the form is incorrect when printed, the form is wasted. This is of particular concern when the forms are sequentially numbered as, for example, are invoices and checks. Ruined sequential forms often need special accounting, adding to the cost of the ruined form. And, of course, time spent by an operator aligning the forms to print properly is wasteful and frustrating. A difficulty in aligning forms will likely result in repeated failures and repeated need to void checks or otherwise adjust for errors.

Horizontal alignment of forms in a printer is usually assisted by marks placed on the printer for locating left and right margins or by standard settings of tractor feed bars. However, vertical alignment is more difficult. Printers have no standard indicators for advancing forms to the proper position. Different printers have different settings, and different forms need to be advanced different distances in order to have information placed properly onto the form by the printer. Experience has shown that the correct vertical alignment of a form by an operator is not easy and often counter-intuitive. If a form was misprinted so that the printer has put the characters too high on the preprinted forms, the proper adjustment is to move the paper higher. Many users do not grasp this easily and move the paper in the wrong direction. The next attempt on the same type of form is likely subject to further failure. Such a trial and error method is slow, frustrating, and wasteful. And this trial and error process must be repeated if there is a change in the operator, the printer, or in some cases the form. With the growth of computer use among novices, a better solution to the problem of aligning forms for printing is increasingly necessary.

SUMMARY

The method and device of this invention automatically achieve proper vertical alignment of forms. They are intended for use by an operator who may be inexperienced with computer printers, and for use with printers which are not specially adapted for a single type of form. In accordance with this invention, novel forms are provided for printing which have numbered or otherwise marked areas along a vertical edge (or edges) of the forms. A computer program is also provided for adjusting the printer to properly align these forms vertically. No modification of a standard printer is necessary.

Part of the novelty and improvement of this invention lies in the use of the specially marked forms in conjunction with a computer program which processes information given by an operator to achieve accurate registration of the form without requiring skill on the part of the operator or extra equipment for the printer.

The method of this invention requires the computer operator to insert forms into the printer, and then operate a computer program (the "start-up program") which will then properly and automatically align the form in the printer. This program instructs the printer to put a mark on the form on the line to which the printer is currently set to print. Alternatively, the start-up program may instruct the printer to print sample information including a marking line or other indicator on the form. If the printed mark or sample information is not on the proper line, the computer then instructs the operator to type into the computer the line number or other indicator on which the mark or sample information was just printed. With this information, the computer automatically calculates the adjustment needed to properly align the form and makes the adjustment by moving the form vertically relative to the printer with no more assistance from the operator. This method may waste one or two forms if the operator has located the form too high in the printer, but, as will be seen, the correction method is so simple that an operator is not likely to waste additional forms or to make a mistake the next time forms are to be printed. Indeed the operator may learn to use existing features on the printer for line-up and avoid the start-up operation altogether.

This invention will be more fully understood in light of the following description taken together with the drawings.

BRIEF DESCRIPTION OF THE DRAWINGS

FIG. 5 shows a specially marked form on which a computer operator has placed a mark using a start-up computer program which is part of one embodiment of this invention.

DETAILED DESCRIPTION

Several embodiments of this invention will be described. It should be understood, however, that this description is illustrative only and is not meant to limit the scope of the invention.

Figures 1A, 4:
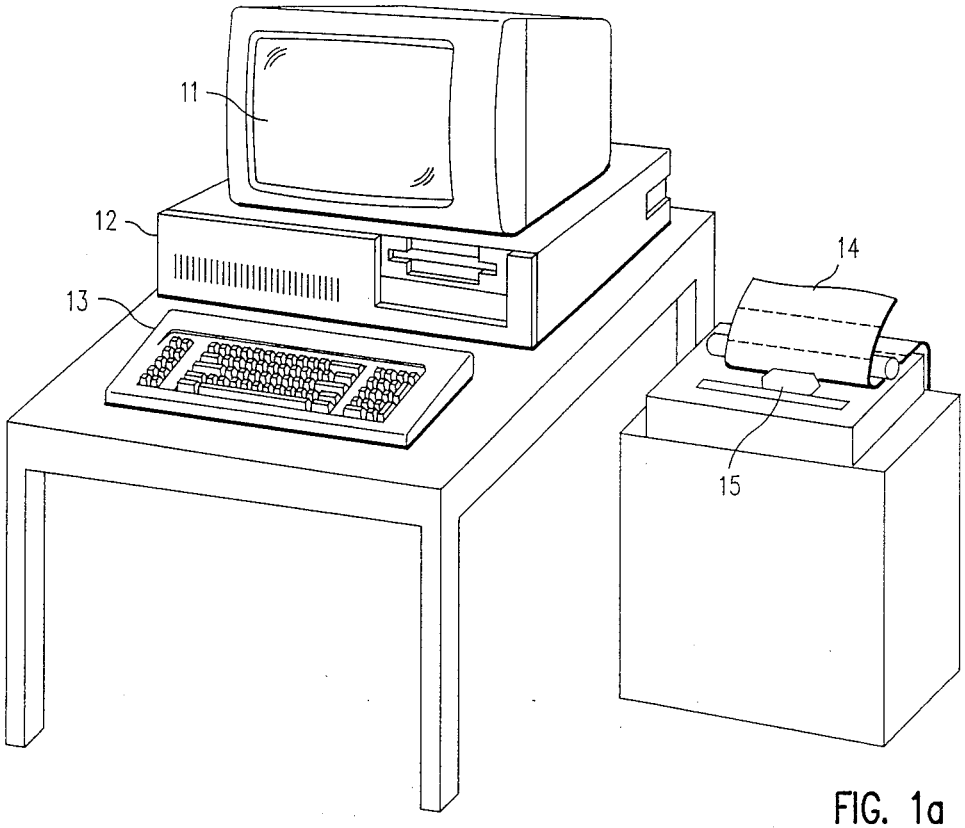
FIG. 1a shows an arrangement of office components appropriate for use in conjunction with this invention.
FIG. 4 shows instructions placed on the computer screen by a start-up computer program which can be used with one embodiment of this invention.

The structure of this invention is used with a computer-printer system such as that shown in FIG. 1a, having programmable memory 12, which can receive input from keyboard 13, display information on screen 11, and print information on forms 14 at the print point in printer 15. It pairs a particular form to be printed, having a given vertical length, given format of places into which information is to be put, and given markings along one or both vertical margins with a start-up computer program which is tailored to properly align that form in a printer. The start-up computer program may be tailored to move the forms through the printer until the top of the form is located under the print head. Alternatively, the program may be tailored to move the forms until the first line on which information is to be printed is located under the print head. Included in the start-up computer program is information that causes the printer to put a mark or a line onto the form so that the location of the mark or line can be compared by an operator with the location of marks preprinted in the vertical margin or margins of the form.

Figure 1B:
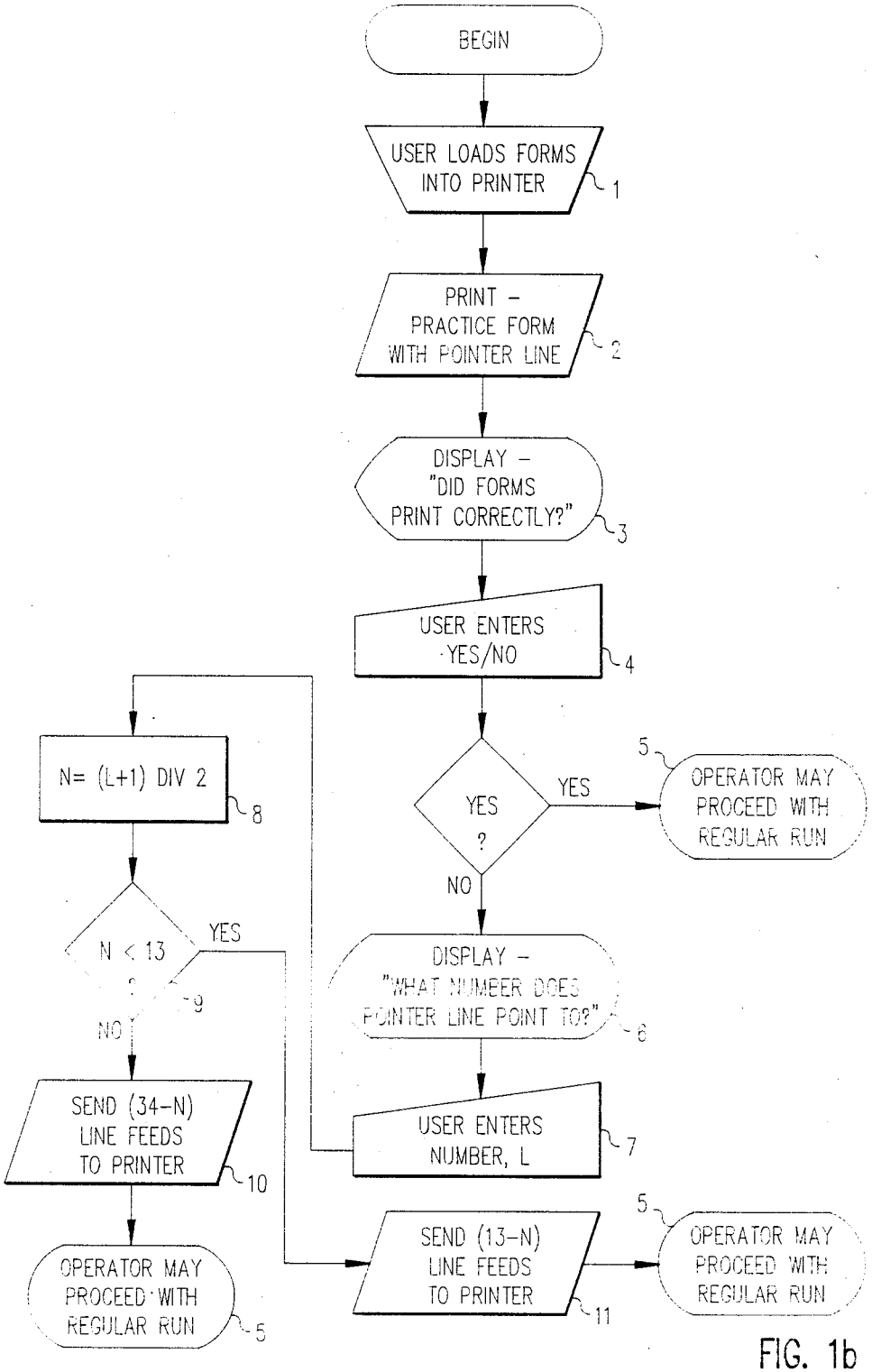
FIG. 1b shows a flow chart which specifies the method steps to be used in one embodiment of this invention.
Figure 2:
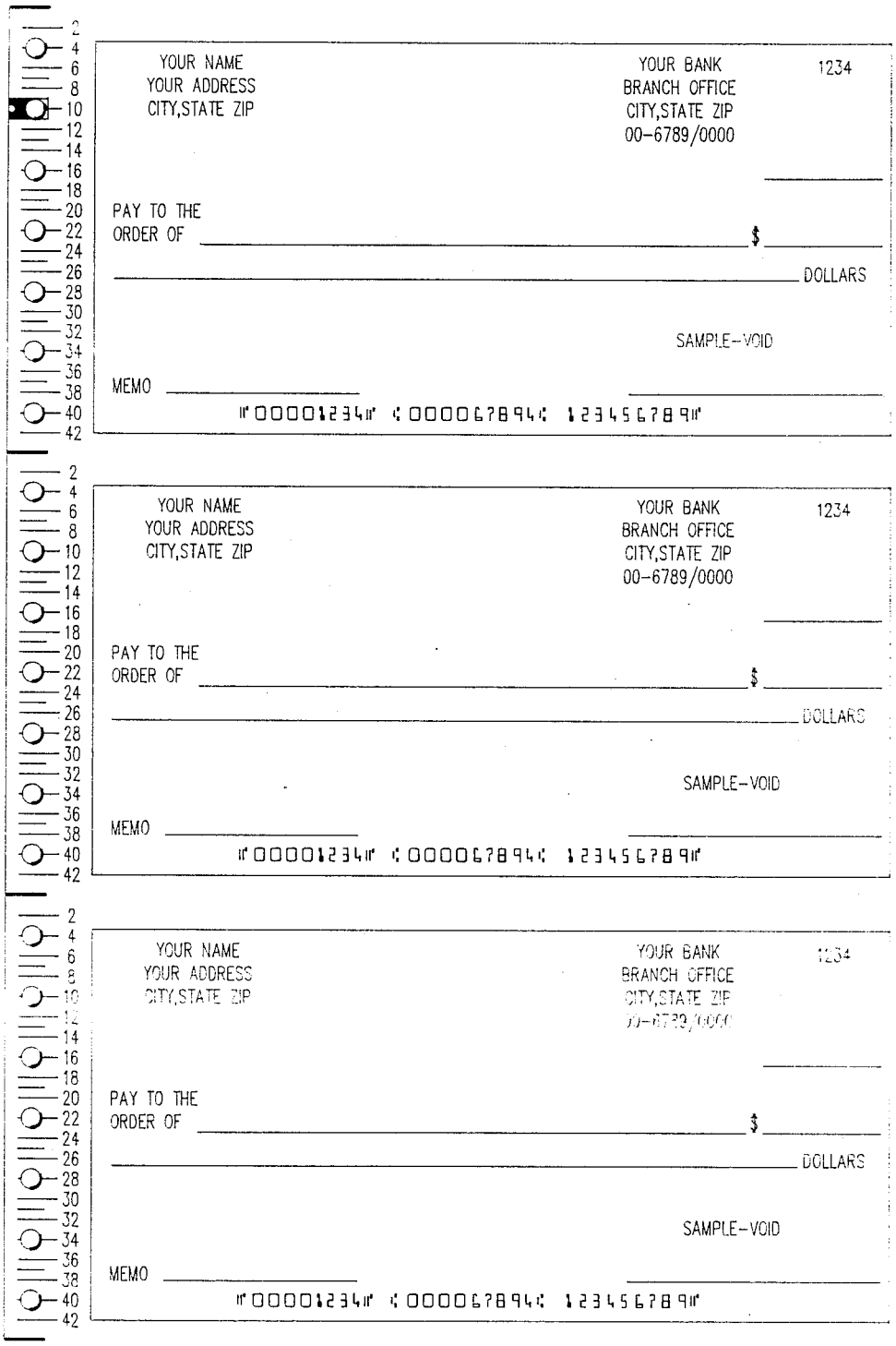
FIG. 2 shows one example of specially marked forms used with this invention.

According to a first embodiment of this invention, which uses the method steps shown in FIG. 1b, the computer operator, or user, feeds the special preprinted forms such as those shown in FIG. 2 into the printer (step 1). The computer operator next uses the computer program specially written in accordance with this invention (hereinafter called a "start-up program"), which adds to the form both sample information and a special pointer line (step 2), as shown in the top form of FIG. 3. The method of operation of a printer is to print a line of information, advance to the next line, print, advance, and so on until all instructions given to it by the computer have been executed. In this embodiment the instructions to the printer include advancing a form until the bottom of the form is adjacent the print head. In the example in FIG. 3, the sample information is merely the kind of information which is properly aligned. In this example, the initial location of the form is too high relative to the print head, resulting in the information to be printed on the first form actually overlapping onto the second form at the termination or conclusion of printing of the sample information. The result is that the second form as well as the first form has been destroyed. If, however, the initial location of the first form relative to the print head were too low, then the sample information would be printed too high on the first form with the result that the second form would be usable.

Figure 3:
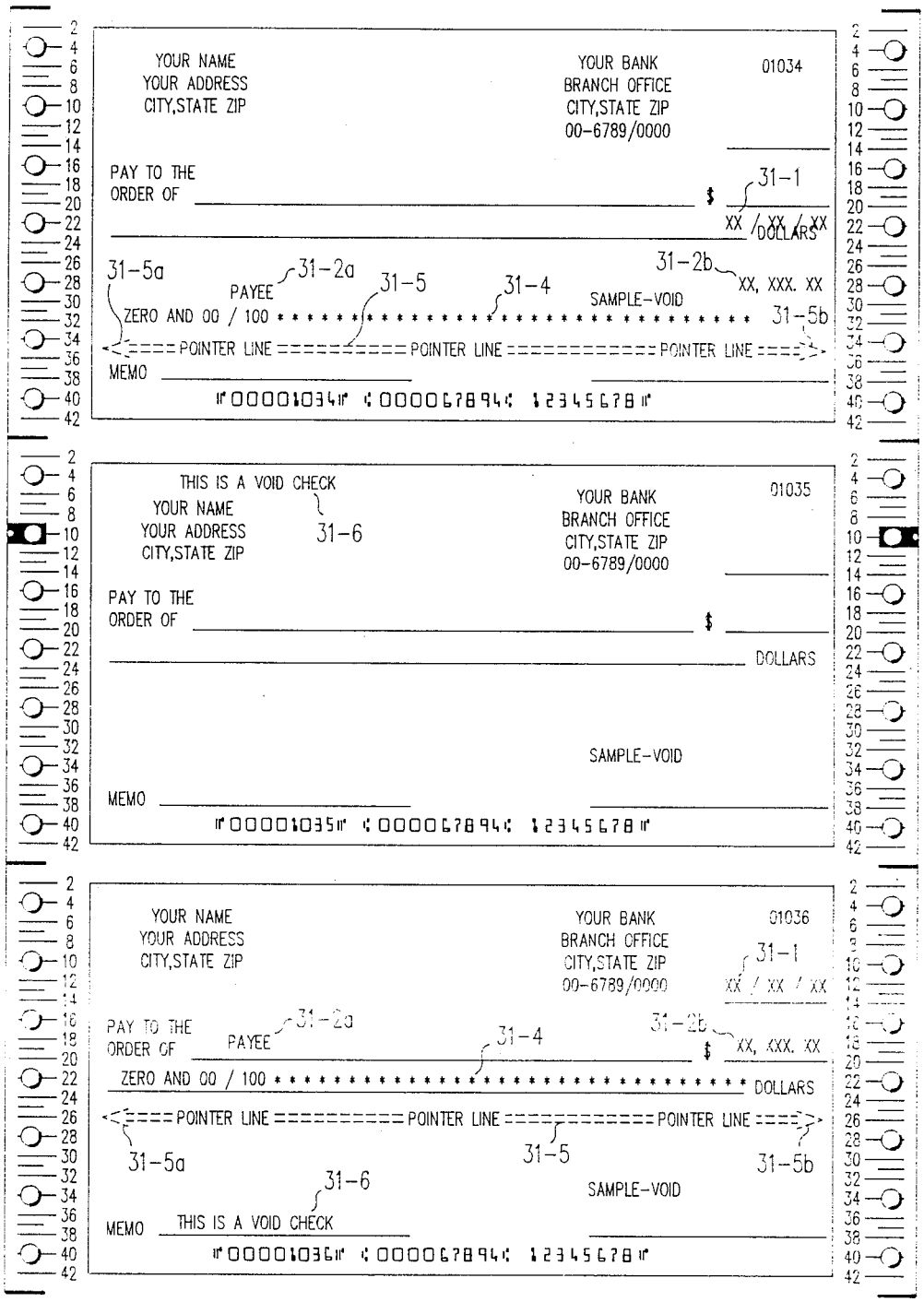
FIG. 3 shows a specially marked form printed with sample information in accordance with this invention.

The next task of the start-up program is to calculate the number of vertical spaces to be advanced so that the forms will be properly aligned for printing subsequent information. The computer program must receive information from the operator, and use that information to calculate the number of vertical spaces to advance the forms through the printer. In the example of FIG. 3, the proper margin mark number to which the pointer line should point is 26. However, the pointer points to mark number 35. Thus, the form is nine marks too high in the printer. The example form shown in FIG. 3 has half-spaced vertical marks in its margin. Most printers move the form only whole spaces. When the print head is located next to mark 10 in the margin of the second form, the top of the second form has been fed 5 spaces past the print head.

The start-up computer program then prints information onto a display screen (step 3), for example that information shown in FIG. 4, which asks the operator if the position of the printout was acceptable. The operator observes the location on the form of the pointer line printed on the practice form and enters "YES" or "NO" (step 4) on the keyboard 13 (FIG. 1a). If the operator has observed that the pointer line is correctly located on the form indicating that the form is properly located relative to the print head to allow the correct placement of information on the form, the operator enters "YES". The start-up operation is now complete and the regular run of forms can commence (step 5). However, as is shown in FIG. 3, if the operator has observed that the form is not properly located relative to the print head to allow the correct placement of information on the form, the operator enters "NO". The computer then instructs the operator not to move the forms in the printer but to type the position number of the margin line L pointed to by the arrow heads 31-5a or 31-5b (FIG. 3) on the pointer line 31-5 (steps 6 and 7). In the example of FIG. 3, the line number L is 35.

The computer then calculates the number of lines the form is to be moved using steps 8, 9, 10 and 11 of the flow chart for the start-up computer program as shown in FIG. 1b. As described above, the example shown in FIG. 3 has half-space vertical marks and most printers move the form only whole spaces. A whole space moved by the printer corresponds to two half-spaces marked on the form. We use the letter L to designate the line number marked in the margin of the form and the letter N to designate the equivalent number of whole spaces which the form is moved by the printer. The computer program takes the line number L input to the program by the operator through keyboard 13 and, together with the information defining the length of the form and the line in the margin of the form to which the pointer arrows 31-5a and 31-5b on the end of line 31-5 point, calculates the number of whole spaces to move the form relative to the printer to properly align the next usable form in the printer. As shown in FIG. 1b, step 8, the start-up program takes the number L of the line to which the pointer line points, as input by the operator, adds 1, divides by 2 and discards the remainder to calculate the number of printer line feeds N below the top of the form on which the pointer line was printed. The proper margin line L on which the pointer line 31-5 should be located as shown in FIG. 3 is 26; thus the equivalent number of line feeds N which the printer should have advanced the top of the form past the print head before printing the pointer line is 13. According to step 9 in FIG. 1b, if the whole number N (corresponding to the margin number L on which the pointer line was printed) is less than 13 (corresponding to a margin number L less than 26), the computer moves to step 11 and instructs the printer to move to the top of form 2 by moving 13 minus N line feeds ahead. If the pointer was at a line L with a higher number than 26, which is the case shown in FIG. 3 where the pointer arrows 31-5a and 31-5b point to line 35, the computer calculates N higher than 13 and moves to step 10. The forms shown in FIG. 3 have 42 lines marked in the left margin, thus it takes the printer 21 whole space line feeds to advance one full form. Because the second form cannot be used and also because most printers cannot reverse the direction of forms movement, the computer will next make the calculation and instruct the printer to advance to the top of the third form, sending 34 minus N line feeds.

A further embodiment of this invention avoids the wasted forms likely to be generated by a new operator using the previously described embodiment. Instead of printing sample information including the pointer line on a first form, the computer is programmed to print a character in the margin of the first form, as depicted in FIG. 5. The margin may consist of a tear-off strip with tractor-feed holes as depicted in FIG. 5 or it may be an integral part of the main body of paper. In one variation of this embodiment a decorative design is combined with the margin numbers. The computer asks the operator to type in the line number on which the mark is printed, and the computer causes the printer to advance the form to the proper position for printing of the information. If the operator has inserted the forms so that the marked line number is less than the line number on which the first information is to be printed, no form is wasted by using this embodiment of the start-up program. The computer simply moves the printer to the first line on which information is to be printed. If the line on which the mark has been printed is lower on the form than the line which is to have the first information printed, the computer advances to the proper position on the second form, and is then ready to commence the printing of a regular run. This embodiment has the disadvantage of providing less visual information to the operator but the advantage of not having to waste a form.

This embodiment can also be used with single sheet forms where each form must be separately aligned in the printer. The operator inserts the form, and runs the start-up program. The program places the mark in the margin, the operator types the line number (or other mark indicator) and the start-up program advances the form to the proper position. Information is then printed on the form.

Indeed, after using the program for the first time, the operator may note characteristics of the form after it has been properly aligned in the printer by the unique method of this invention. For example, if the printer has a tear-off bar, the operator may note which margin indicator or line number has been brought into alignment with the tear-off bar. Different printers have different physical features most easily used by an operator for forms alignment. An operator who uses the method several times will learn to properly align forms using characteristics of the existing printer, and subsequently skip the automatic alignment step altogether.

A further embodiment of this invention combines a computer program designed to put a mark on the center of a page with a form for a two-column format having a vertical strip of line numbers and/or tick marks running down the center of a page.

Although the above embodiments instruct the operator to type into the computer the line number or other indicia on which the printer has placed a mark, another embodiment instructs the operator to type into the computer a counted number of marks from the top of the form. And whereas the first embodiment described above and shown in FIG. 3 prints a pointer line on the first form along with sample information, a similar embodiment puts actual information on the first form as part of the start-up program and places a mark in the margin or center strip rather than placing a line in the body of the form.

The method of this invention, which is to use marked forms with a computer program which places marking information on the form, receives information supplied by a user about the location of the marking information, and adjusts the location of the form, accordingly applies to all these embodiments. With the method and apparatus of this invention, no calculation or second guessing by the operator is necessary. If the printer is of a design where the location of characters to be printed next is not obvious, the operator is not hampered by this design. The computer program automatically does "the thinking" previously done by an operator. An operator can make the proper adjustment on first use of the method with the marked forms, and after first use of the method will not continue to waste forms at the start up of subsequent runs.

Other embodiments of this invention will be obvious to those skilled in the art.

We claim:

1. A method for accurately registering forms to be printed at a print position in a printer controlled by a computer which is operated by an operator with instructions from said computer, each form having the same format as the other forms and having vertically spaced indicia defining lines on said form, comprising:
- inserting into said printer a series of said forms so that part of a selected one of said forms is adjacent said print position in said printer;
- running a computer program to adjust said forms in said printer with assistance from said operator, said computer program:
  - causing said printer to place an alignment mark on said selected form of said forms, and
  - displaying to said operator questions relating to alignment of said selected form;
- inputting manually to said computer the indicia defining on which of said lines said alignment mark was placed;
- said computer program calculating automatically from said information input to said computer a printer adjustment to cause said print position is said printer to coincide with a preselected starting position on said forms; and
- moving automatically said forms in said printer without need for assistance from said operator so that said printing starts on said forms at said preselected position.

2. Method of claim 1 where said indicia are numbers corresponding to lines printed by said printer.

3. Method of claim 1 where said indicia are numbers corresponding to half-lines printed by said printer.

4. Method of claim 1 where said indicia are placed in a vertical margin along an edge of said selected form.

5. Method of claim 4 where said vertical margin is a tear-off portion having tractor-feed holes.

6. Method of claim 1 where said computer program sends commands to said printer to print said mark, displays questions to said operator relating to alignment of said selected form, receives responses from said operator related to alignment of said selected form, calculates a number of line feeds using said response from said operator, and sends commands to said printer to advance said number of line feeds.

7. Method of claim 1 where said alignment mark comprises sample information having a format similar to that to be printed on subsequent forms and having a pointer line for pointing to said indicia and thereby identifying the location of said mark.

8. Method of claim 4 where said alignment mark is placed in said vertical margin of said selected form.

9. Structure for accurately registering forms to be printed at a print position in a printer controlled by a computer which is operated by an operator with instructions from said computer, each form having the same format as the other forms and having vertically spaced indicia defining lines on said form, comprising:
- means for inserting into said printer a series of said forms so that part of a selected form of said forms is adjacent said print position in said printer;
- means for running a computer program to adjust said forms in said printer with assistance from said operator such that said print position in said printer coincides with a preselected starting position on said forms, comprising:
- means for causing said printer to place an alignment mark on said selected form;
- means for displaying to said operator questions relating to alignment of said selected form;
- means for inputting manually to said [compute] *computer* the indicia defining on which of said lines of said selected form said alignment mark was placed;
- means for calculating automatically from said information input to said computer a printer adjustment to cause the print position in said printer to coincide with a preselected starting position on said forms; and
- means for moving automatically said forms in said printer without need for assistance from said operator so that said printing starts on said forms at said preselected starting position.

10. Structure of claim 9 where said indicia are comprised of numbers corresponding to lines printed by said printer.

11. Structure of claim 9 where said indicia are comprised of numbers corresponding to half-lines printed by said printer.

12. Structure of claim 9 where said indicia are placed in a vertical margin along an edge of said selected form.

13. Structure of claim 12 where said vertical margin is a tear-off portion having tractor-feed holes.

14. Structure of claim 9 where said computer program controls:

means for sending commands to said printer to print said mark, means for displaying questions to said operator, means for receiving a response from said operator related to the location of said mark, means for calculating a number of line feeds using said response from said operator, and means for sending commands to said printer to advance said number of line feeds.

15. Structure of claim 9 where said alignment mark comprises sample information having a format similar to that to be printed on subsequent forms and having a pointer line for pointing to said indicia and thereby identifying the location of said mark.

16. Structure of claim 12 where said mark is placed in said vertical margin of said selected form.

17. A method for accurately registering forms to be printed at a print position in a printer controlled by a computer which is operated by an operator with instructions from said computer, each form having the same format as the other forms and having an identifiable pre-printed mark, comprising:

inserting into said printer a series of said forms so that part of a selected one of said forms is adjacent said print position in said printer;

running a computer [porgram] *program* to adjust said forms in said printer with assistance from said operator, said computer program:

causing said printer to place vertically spaced alignment indicia on said selected form of said forms; and displaying to said operator questions related to alignment of said forms;

inputting manually to said computer information defining which of said vertically spaced alignment indicia was placed on said identifiable pre-printed mark;

said computer program calculating automatically from said information input to said computer a printer adjustment to cause said print position in said printer to coincide with a preselected starting position on said forms; and moving automatically said forms in said printer without need for assistance from said operator so that printing starts on said forms at said preselected starting position.

18. Method of claim 17 where said computer program commands said printer to print said vertically spaced alignment indicia, displays questions to an operator related to the location of said vertically spaced alignment indicia on said selected form, receives responses from said operator related to the location of said vertically spaced alignment indicia, calculates a number of line feeds using said response from said operator, and sends commands to said printer to advance said number of line feeds.

19. Structure for accurately registering forms to be printed at a print position in a printer controlled by a computer which is operated by an operator with instructions from said computer, each form having the same format as the other forms and having an identifiable pre-printed mark, comprising:

means for inserting into said printer a series of said forms so that part of a selected one of said forms is adjacent said print position in said printer;

means for running a computer program to adjust said forms in said printer with assistance from said operator such that said print position in said printer coincides with a preselected starting position on said forms, comprising:

means for causing said printer to place vertically spaced alignment indicia on said selected from of said forms;

means for displaying to said operator questions related to the alignment of said selected form;

means for inputting manually to said computer information defining which of said vertically spaced alignment indicia was placed on said identifiable pre-printed mark;

means for calculating automatically from said information input to said computer a printer adjustment to cause said print position in said printer to coincide with a preselected starting position on said forms; and means for moving automatically said forms in said printer without need for assistance from said operator so that said printing starts on said forms at said preselected starting position.

20. Structure of claim 19 where said computer program controls:

means for sending commands to said printer to print said vertically spaced alignment indicia, means for displaying questions to said operator, means for receiving responses from said operator related to the location of said vertically spaced alignment indicia, means for calculating a number of line feeds using said response from said operator, and means for sending commands to said printer to advance said number of line feeds.

*21. A method for aligning a preprinted form with a print position of a printer in a computerized printing system comprising:*

*inserting the form into the printer;*

*causing the printer to print an alignment mark on the form at a location of the form corresponding to the print position of the printer;*

*having a computer operator look at the location where the alignment mark was printed;*

*having the computer operator supply information indicating to the computerized system the location at which the alignment mark was observed; and*

*causing the computerized system to determine automatically, based on the information supplied by the computer operator, an amount of form movement needed to bring a preselected portion of the form into alignment with the print position of the printer when there is an alignment error.*

*22. The method of claim 21 further comprising:*

*causing the printer to automatically move the form according to the determined amount of needed form movement so as to bring the preselected portion of the form into alignment with the print position of the printer.*

*23. A computerized system for automatically aligning a preprinted form having preprinted indicia with a print position of a printer in the computerized system, comprising:*

*printing means for automatically moving the preprinted form and for printing marks on the preprinted form at one or more locations of the form corresponding to the print position of the printer;*

*alignment marking means for causing the printing means to print an alignment mark on the preprinted form;*

*information receiving means for receiving from a computer operator information indicating the location of the printed alignment mark relative to the preprinted indicia of the form; and*

*adjustment determining means for automatically determining, based on the information provided by the computer operator, an amount of form movement needed for bringing a preselected portion of the form into alignment with the print position when there is an alignment error and for supplying one or more movement commands to the printing means so as to move the form according to such amount of movement determination.*

*24. The computerized system of claim 23 wherein the information receiving means comprises a keyboard.*

* * * * *

UNITED STATES PATENT AND TRADEMARK OFFICE

CERTIFICATE OF CORRECTION

PATENT NO. : RE 33,498

DATED : December 18, 1990

INVENTOR(S) : Thomas A. Proulx and Thomas H. A. LeFevre

It is certified that error appears in the above-identified patent and that said Letters Patent is hereby corrected as shown below: On the title page, Item[75]

Inventor Thomas A. Proulx's address should be --Portola Valley--.

Column 4, line 34, delete "at the print point in" and insert --using--.

Signed and Sealed this

Third Day of August, 1993

*Attest:*

Michael K. Kirk

MICHAEL K. KIRK

*Attesting Officer*

*Acting Commissioner of Patents and Trademarks*